United States Patent Office 2,961,456
Patented Nov. 22, 1960

2,961,456

PREPARATION OF THIOPHOSPHORYL COMPOUNDS

Simon Zevin, Denver, Colo., assignor to Shell Oil Company, New York, N.Y., a corporation of Delaware No Drawing. Filed Dec. 2, 1958, Ser. No. 777,609

7 Claims. (Cl. 260—461)

The present invention concerns an improved method for the synthesis of dialkoxythiophosphoryl chlorides which are intermediates in the preparation of valuable insecticidal compounds. More specifically, the present invention relates to the preparation of dimethoxythiophosphoryl chloride useful in the preparation of the insecticide O,O-dimethyl-O-p-nitrophenyl thiophosphate sold under the name methyl parathion. In the past, dialkoxythiophosphoryl chlorides have been made by reacting the appropriate O,O-dialkyldithiophosphate with molar chlorine under specified conditions. The product so produced, however, appears to be less heat stable than the product made in accordance with the present invention. Another method of preparation heretofore used has been the reaction of phosphorus pentachloride and O,O-dialkyldithiophosphate or a salt thereof in an inert volatile liquid medium such as benzene. This is also undesirable because it necessitates the preparation and handling of solid phosphorus pentachloride. It is consequently the principal object of the present invention to provide a method for the production in good yield of dialkoxythiophosphoryl chloride without the disadvantages inherent in prior methods.

It has now been discovered that the reaction of O,O-dialkylphosphorodithioic acid, such as O,O-dimethylphosphorodithioic acid with phosphorus trichloride, followed by chlorination of the resulting intermediate compound, produces a high yield of dialkoxythiophosphoryl chloride, such as dimethoxythiophosphoryl chloride. The chemical reaction of the present method for the production of dialkoxythiophosphoryl chlorides may be presented by the following equations:

(a)  $(RO)_2P(S)SH + PCl_3 \longrightarrow (RO)_2P(S)SPCl_2 + HCl$
                I                                II (b)  $(RO)_2P(S)SPCl_2 + Cl_2 \longrightarrow (RO)_2P(S)Cl + P(S)Cl_3$
                II                              III In these equations, R may represent a lower alkyl group preferably containing 1 through 5 carbon atoms such as methyl, propyl, isopropyl and pentyl. Compounds representative of I are O,O-dimethylphosphorodithioic acid, O,O-dipropylphosphorodithioic acid, O,O-disopropylphosphorodithioic acid, and O,O-dipentylphosphorodithioic acid. Compounds representative of II are dichloro(O,O-dimethylphosphorodithio)phosphine, dichloro(O,O - diethylphosphorodithio)phosphine, dichloro(O,O - dibutylphosphorodithio)phosphine and dichloro(O,O-diisopentylphosphorodithio)phosphine. Compounds representative of III are dimethoxythiophosphoryl chloride, dipropoxythiophosphoryl chloride and dipentoxythiophosphoryl chloride. From these equations, it will be apparent that the process of the present invention comprises the steps of reacting the appropriate dithio acid with phosphorus trichloride and chlorinating the resulting intermediate compound to form the thio acid chloride.

In one synthesis employing this method, phosphorus trichloride was added to O,O-dimethylphosphorodithioic acid at a temperature of approximately 20° C. The reaction was slightly endothermic, perhaps due to the evolution of HCl during the reaction. The formation of dichloro(O,O-dimethylphosphorodithio)phosphine was evidenced by infrared spectrum analysis. The phosphine intermediate was immediately chlorinated at a temperature of 20–30° C. Approximately 1200 B.t.u./lb. of chlorine resulted from the exothermic reaction taking place with the addition of chlorine. The operation was smooth and proceeded without the formation of undesirable solids. The product, dimethoxythiophosphoryl chloride, was purified by flash distillation.

In another synthesis employing the method of the present invention, two 50-gallon batches of dimethoxythiophosphoryl chloride were prepared in a 100-gallon water-jacketed glass-lined reactor. Preparation of the intermediate compound was carried out at 20–30° C., while the chlorination of the intermediate was carried out at about 20–30° C. and 60–65° C. Chlorination proceeded smoothly at both reaction temperatures. When a temperature of 20–30° C. is employed, a somewhat longer chlorination period is required unless refrigerated coolant is provided. The reaction can be easily controlled at 60–65° C. with cooling water. Yields of 75% or greater based on $P_2S_5$ were obtained. The product may, if desired, be purified by flashing. The best resolution of components is effected by fractionating the flashed crude product through a ten-tray Oldershaw column. This fractionation results in recovery of 95% by weight of the dimethoxythiophosphoryl chloride.

The temperature of the reaction between the O,O-dialkylphosphorodithioic acid and phosphorus trichloride may vary considerably without departing from the scope of the present invention. It is preferred, however, to add the phosphorus trichloride to the dithio acid at a temperature range of 0° C. to 70° C. A temperature range of 20° to 65° C is considered more preferable and a temperature range of 20° to 30° C. is considered most preferable.

The chlorination of the phosphine intermediate may also take place at a temperature of 0° C. to 70° C. with a temperature of 60° to 70° C. most preferred.

The following table shows the effect of reaction variables on the yield of dimethoxythiophosphoryl chloride. It will be understood, however, that this table exemplifies some of the reactions employed and that the present invention is not limited to the specific reaction conditions recited therein.

| Run No. | Mol ratio of chlorine and phosphorus trichloride to O,O-dimethylphosphorodithioic acid | Chlorination Reaction Temperature | Dimethoxythiophosphoryl chloride reactor yield Percent mol based on $P_2S_5$ |
|---|---|---|---|
| 1 | 1.00 | 20–30 | 75 |
| 2 | 1.15 | 20–30 | 89 |
| 3 | 1.15 | 60–65 | 89 |
| 4 | 1.15 | 20–30 | 82 |
| 5 | 1.15 | 60–65 | 75 |

The present process offers several distinct and totally unexpected advantages over those heretofore used. Among the most important advantages is the total elimination of the solids handling problem. Employing the present method, phosphorus trichloride and chlorine may be added to O,O-dimethylphosphorodithioic acid so that both O,O-dimethylphosphorodithioic acid and dimethoxyphosphoryl chloride can be produced in successive steps in the same reaction vessel without transferring the O,O-dimethylphosphorodithioic acid from one vessel to another. Moreover, the elimination of reaction solvent permits greater production in the same size equipment. Yet another disadvantage of employing $PCl_5$, now altogether avoided by the present method, is the tendency of the PCl₅ to deposit on the upper surfaces of the reactor so that its reaction with the O,O-dimethylphosphorodithioic acid is inefficient.

I claim as my invention:

1. The method for the production of dialkoxythiophosphoryl chloride comprising reacting O,O-dialkylphosphorodithioic acid with phosphorus trichloride to form the corresponding dichloro(O,O-dialkylphosphorodithio)phosphine and reacting the said dichloro(O,O-dialkylphosphorodithio)phosphine with molecular chlorine.

2. The method for the preparation of dialkoxythiophosphoryl chloride comprising reacting O,O-dialkylphosphorodithioic acid with phosphorus trichloride at a temperature of 0° to 70° C. to form the corresponding dichloro(O,O-dialkylphosphorodithio)phosphine and reacting the dichloro(O,O-dialkylphosphorodithio)phosphine with molecular chlorine.

3. The method for the preparation of dialkoxythiophosphoryl chloride comprising reacting O,O-dialkylphosphorodithioic acid with phosphorus trichloride at a temperature of 0° C. to 70° C. to form the corresponding dichloro(O,O-dialkylphosphorodithio)phosphine and reacting the said dichloro(O,O-dialkylphosphorodithio)phosphine with molecular chlorine at a temperature of 0° C. to 70° C.

4. The method for the preparation of dimethoxythiophosphoryl chloride comprising reacting O,O-dimethylphosphorodithioic acid with phosphorus trichloride to form the corresponding dichloro(O,O-dialkylphosphorodithio(phosphine and reacting the said dichloro(O,O-dialkylphosphorodithio)phosphine with molecular chlorine.

5. The method for the preparation of dimethoxythiophosphoryl chloride comprising reacting O,O-dimethylphosphorodithioic acid with phosphorus trichloride at a temperature of 0° C. to 70° C. to form the corresponding dichloro(O,O-dialkylphosphorodithio)phosphine and reacting the said dichloro(O,O-dimethylphosphorodithio)phosphine with molecular chlorine at a temperature of 0° C. to 70° C.

6. The method for the preparation of dimethoxythiophosphoryl chloride comprising reacting O,O-dimethylphosphorodithioic acid with phosphorus trichloride at a temperature of 0° C. to 70° C. to form the corresponding dichloro(O,O-dialkylphosphorodithio)phosphine and reacting the said dichloro(O,O-dimethylphosphorodithio)phosphine with molecular chlorine at a temperature of 0° C. to 70° C., and fractionating said product to produce dimethoxythiophosphoryl chloride.

7. The method defined in claim 1 wherein the chlorination of the dichloro(O,O-dialkylphosphorodithio)phosphine is carried out in situ in the crude reaction mixture formed by the reaction of the dialkylphosphorodithioic acid and the phosphorus trichloride.

References Cited in the file of this patent

UNITED STATES PATENTS

| | | |
|---|---|---|
| 2,715,136 | Toy et al. | Aug. 9, 1955 |

FOREIGN PATENTS

| | | |
|---|---|---|
| 458,770 | Italy | July 28, 1950 |

OTHER REFERENCES

Topley: Chemistry and Industry, 1950, 863.

Van Wazer: Phosphorus and Its Compounds, vol. 1, Chemistry, page 236 (1958), Interscience Publishers Inc., New York, N.Y.